July 28, 1942. N. I. HALL 2,291,036
SELECTING SYSTEM
Filed Feb. 8, 1941 3 Sheets-Sheet 1

FIG. I

INVENTOR
N. I. HALL
BY
ATTORNEY

Fig. 2

July 28, 1942.   N. I. HALL   2,291,036
SELECTING SYSTEM
Filed Feb. 8, 1941   3 Sheets-Sheet 3

INVENTOR
N. I. HALL
BY
ATTORNEY

Patented July 28, 1942

2,291,036

UNITED STATES PATENT OFFICE 2,291,036

SELECTING SYSTEM

Nathan I. Hall, Long Island City, N. Y., assignor to Bell Telephone Laboratories, Incorporated, New York, N. Y., a corporation of New York Application February 8, 1941, Serial No. 377,994

8 Claims. (Cl. 179—18)

This invention relates to testing and selecting systems and particularly to systems for testing lines, links, trunks, or other electrical circuits.

The objects of the invention are to increase the speed with which groups of circuits are tested; to simplify and economize in the equipment employed for performing these tests; to enable rapid repetitions of the testing operation in a brief space of time; and to obtain other improvements in systems of this kind.

In accordance with this invention, the foregoing objects are realized by means of a testing and selecting system in which the trunks or other circuits of a group are tested in a definite order and in rapid succession and repeatedly by a series of space discharge devices or tubes until an idle one is found. More specifically the system is one in which the control elements of the successive tubes are connected respectively to the test conductors of the trunks of the group to be tested, in which the starting gaps of the tubes are ionized momentarily one after the other and in rapid succession by impulses of successive phases, in which the ionization of the first tube whose control element indicates the associated trunk is idle causes current to flow in the main discharge circuit of said tube, and in which the flow of current in the main discharge circuit of any one of the tubes prevents the subsequent ionization of any other starting gap and also causes the operation of a device to indicate the idle condition of the associated trunk.

A feature of the invention is a testing system in which the tubes of the series are ionized consecutively and in rapidly recurring cycles, whereby each tube is ionized repeatedly in its own phase to make repeated tests of the associated trunk. This arrangement makes it possible to perform a large number of separate tests of each one of the trunks within the interval of time alloted for testing the group.

Another feature of the invention is a testing system in which the flow of current in the main discharge circuit of any test tube alters the voltage of the starting gaps of all other tubes so that these starting gaps are unresponsive thereafter to the phase impulses that are repeatedly applied thereto.

These and other features of the invention will be discussed more fully in the following specification.

In the drawings accompanying the specification:

Fig. 2 shows a testing and selecting mechanism for testing the lines of the groups illustrated in Fig. 1. This figure also discloses a connecting device for associating the testing mechanism with the desired group of lines.

Figure 1:
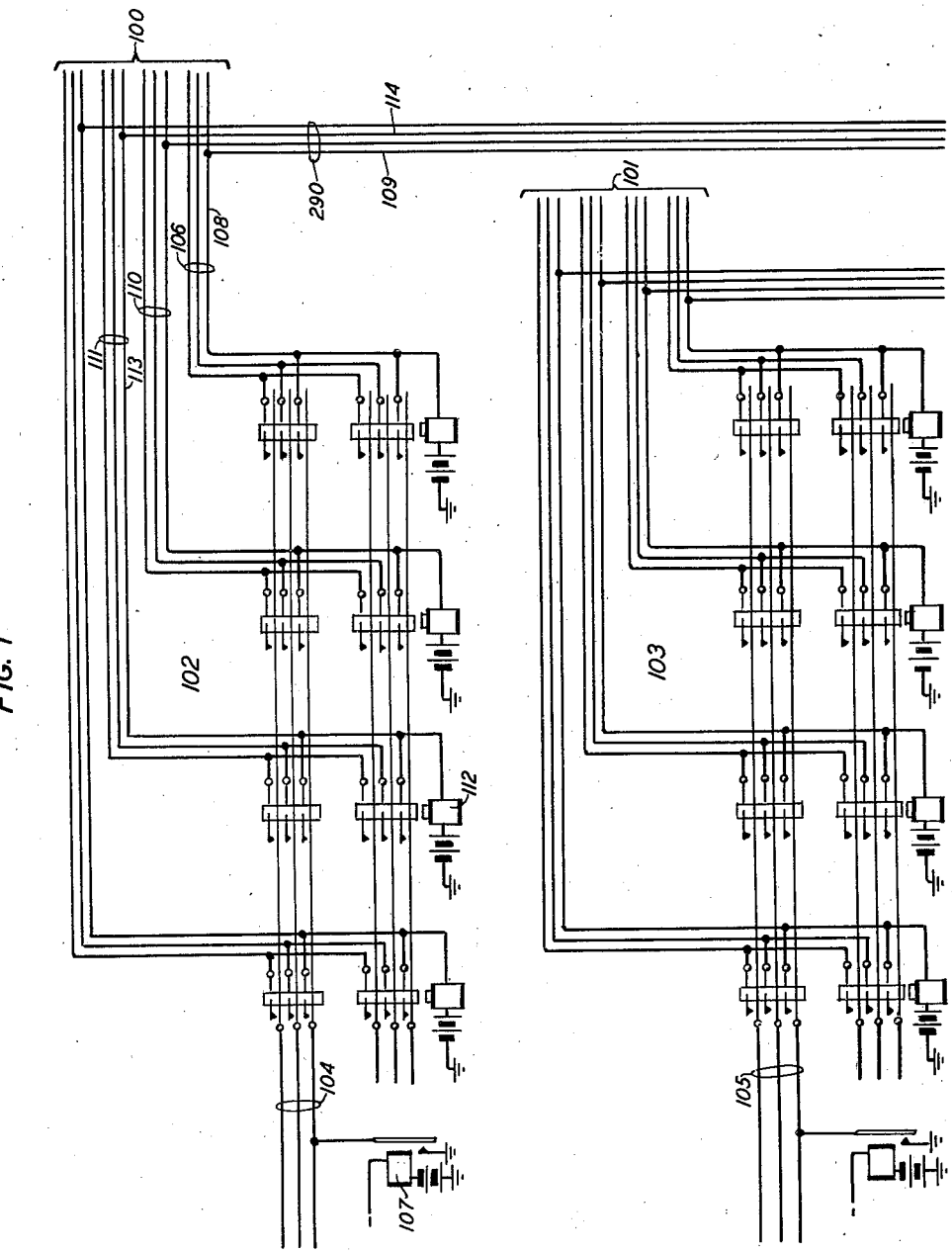
Fig. 1 illustrates two groups of lines or trunks, such as those used for extending connections in telephone systems.

While the invention is applicable broadly to testing and selecting systems, it is particularly useful in testing the lines, trunks or other circuits employed at the selective stages of automatic telephone systems. Although not so limited, it is also particularly applicable to systems in which the selection of trunk groups is under the control of a common controlling mechanism, such as a central office sender or marker, the marker serving to test the desired trunk groups and also to control the operation of the switches for extending connections to the selected trunks in these groups.

The drawings illustrate the invention applied to a switching stage in an automatic telephone system in which a common mechanism or marker controls the selective switches and performs the necessary tests of the outgoing trunk groups. Only two groups of trunks 100 and 101 are illustrated, although it will be understood that any desired number of groups may be included in the testing system. These trunk groups are shown outgoing from the automatic switches 102 and 103, respectively. These switches may be of any suitable type; and for the purpose of illustration switches of the cross-bar type are shown. The switches 102 and 103 serve to extend connections to the trunk groups 100 and 101 from incoming circuits, such as the circuits 104 and 105, respectively. For a better understanding of the cross-bar switch and of the switching systems in which they are used, reference is made to the patent to Reynolds, No. 2,021,329 of November 19, 1935, and the patent to Carpenter, No. 2,093,117 of September 14, 1937.

In the present system the trunks of the groups 100 and 101, and other groups not shown, are tested and selected by the common mechanism 200 which includes a series of discharge tubes 280. The tubes of the group 280 are associable respectively with the trunks of the group to be tested, each tube serving to test one of the trunks of the group. While the number of tubes in the group may be varied at will, it will be assumed for the purpose of illustration that there are ten of these tubes 201, 202, 203 . . . 210. The starting electrodes 211, 212, 213 . . . 220 of the ten tubes are connected respectively to the ten output circuits 221, 222, 223 . . . 230 of an impulse generator 281. Generator 281 is energized by a source of alternating current 282 of any suitable frequency and serves to produce during each cycle of the source 282 a series of ten impulses of successive phases. These momentary impulses are of positive polarity and are applied, as above mentioned, over the respective impulse circuits 221 to 230 to the starting electrodes of the tubes of the group 280.

The cathodes 231, 232, 233 . . . 240 are connected to the common conductor 283, which in turn is connectable through the contacts of relay 284, through the common resistance 285, to the negative pole of battery 286. The anodes 241, 242, 243 . . . 250 of the ten tubes are connected respectively through the windings of relays 251, 252, 253 . . . 260 to the positive pole of battery 287.

A connector 288 is provided for the purpose of connecting the common testing and controlling mechanism 200 to the desired group of trunks. In any well-known manner the connector 288 may be operated at the desired time to connect the mechanism 200 to the trunk group, such as the group 100. When this connection is completed, the control electrodes 261, 262, 263 . . . 270 of the ten tubes 280 are connected, by way of conductors 289 and conductors 290, to the test conductors of the respective trunks of the group 100.

Following the operation of connector 288, or at any suitable previous time, the relay 284 is operated to connect the negative pole of battery 286 through the common resistance 285 to the cathodes of the tubes 280, thus impressing upon the cathodes of these tubes the potential of the battery 286. Also, an impulse of positive polarity is applied to the starting electrode of each of the ten tubes 280 for each cycle of the source 282, these impulses occurring in succession corresponding to the ten phases of the generator 281. The purpose of these impulses is to produce operating voltages in rapid succession across the starting gaps of the tubes. For example, each time a positive impulse is applied to the starting electrode 211 of the tube 201, the voltage across the gap 211—231 resulting from this impulse and the battery 286 is sufficient to ionize the starting gap of the tube. Similarly, the starting gap of each of the succeeding tubes is ionized each time the impulse of the corresponding phase is applied to the starting electrode.

Although the starting gaps of the tubes ionize in response to the phase impulses, no one of these tubes will transfer the ionization to its main anode unless the trunk to which the tube is connected is idle. All busy trunks are identified by the presence of the usual ground potential on the test conductors thereof. For instance, if the trunk 106 is busy, a circuit may be traced from ground through the operated contact of relay 107, through the contacts of the switch 102, to the test conductor 108 of the busy trunk. This ground potential is extended over conductor 109 through the connector 288, conductor 291, to the control electrode 261 of the tube 201. The presence of ground potential on the electrode 261 prevents the discharge of the tube 201 in response to the ionization of its starting gap 211—231. Similarly, if the next trunk 110 in the group is busy, ground potential exists on the control electrode 262 of tube 202, and this tube will not discharge its main gap in response to ionization of the starting gap. Assume, however, that the next trunk 111 is idle. This being the case, a circuit may be traced from the positive pole of battery through the winding of switch magnet 112 to the test conductor 113 of the trunk 111. Positive potential is, therefore, extended from conductor 113 over conductor 114, through the connector 288, conductor 292, to the control electrode 263 of the corresponding tube 203. When, therefore, an impulse of the phase corresponding to tube 203 is applied to the electrode 213 to ionize the starting gap 213—233, the positive potential on the control electrode 263, indicating that the trunk is idle, causes discharge current to flow in the main gap of said tube. The circuit for the main gap may be traced from the positive pole of battery 287, through the winding of relay 253, anode 243, cathode 233, conductor 283, contacts of relay 284, common resistance 285 to the negative pole of battery 286. Current flowing in this circuit operates the relay 253 to register the fact that the trunk 111 is idle. Current flowing in the common resistance 285 produces a voltage drop across this resistance which lowers the negative potential on the cathodes 231, 232 . . . 240 of all remaining tubes in the group. Hence when positive impulses from the generator 281 are subsequently applied to the starting electrodes of these tubes, the resulting voltages across the starting gaps are insufficient to cause ionization. Therefore, all other tubes are rendered ineffective, and no one of them can discharge even though the corresponding trunk in the group 100 is idle. The operated relay 253 may serve in any well-known manner to cause the operation of the selective switches to extend a connection over the corresponding idle trunk 111.

After the trunk has been selected and the switch operated, the connector 288 may be released to free the common testing and selecting mechanism 200 for use in connection with other groups of trunks.

It will be noted that the ionization of the starting gaps of the successive tubes in the series 280 occurs at a rapid rate, namely, once per cycle of the source 282. If all trunks of the group are busy at the time the testing commences, the ionization of the tubes will be repeated in rapid succession until a trunk becomes idle or until the time allowable for testing has expired. The rapidity of this testing cycle makes it possible to perform a large number of tests of the trunk group within the time allotted for the testing operation.

If desired the pulse leads 221 . . . 230 may be opened and closed by switching contacts to control the application of the pulses to the tubes.

Figure 2:
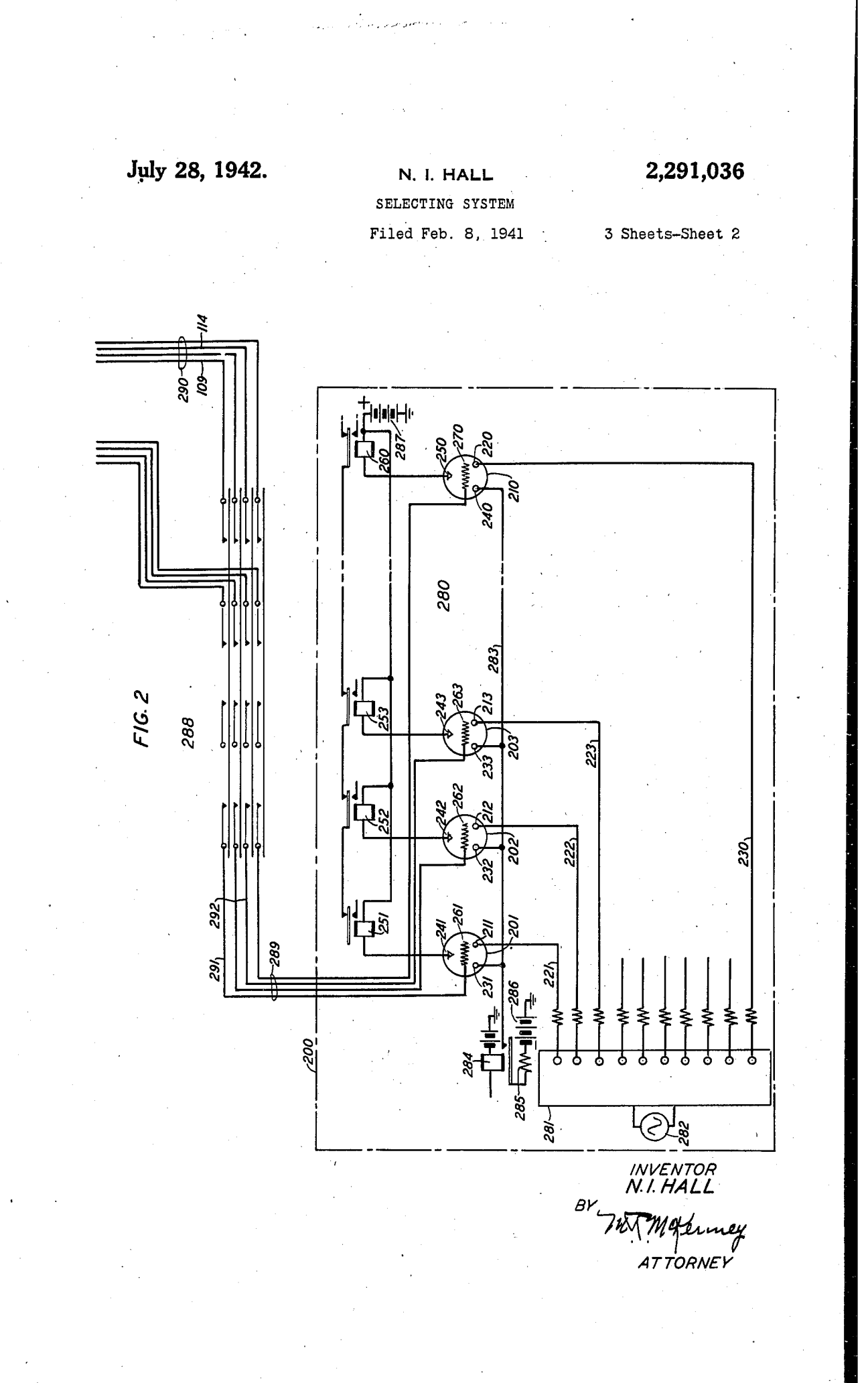
Figure 3:
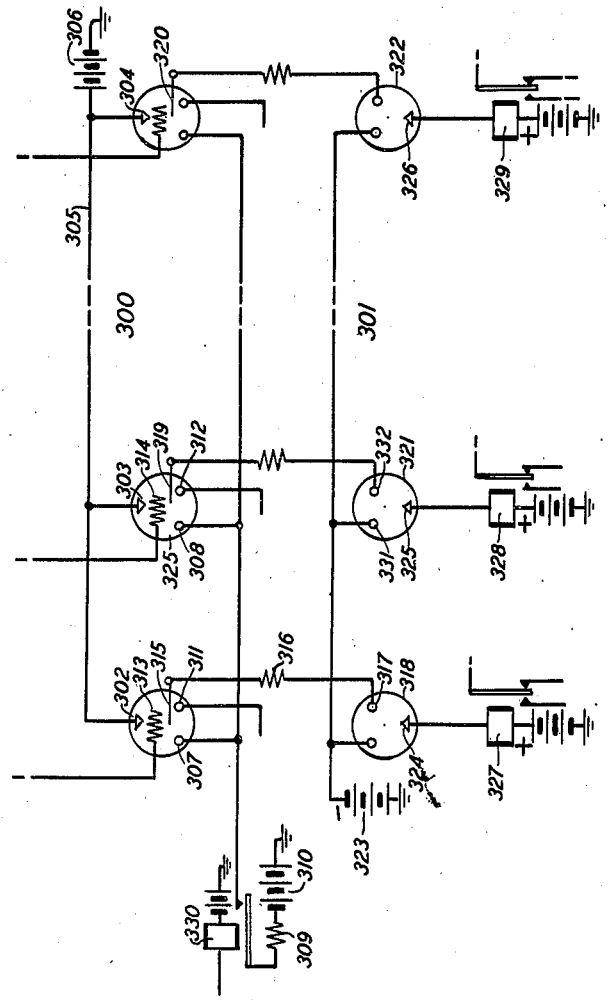
Fig. 3 illustrates an alternative form of the testing and selecting circuit.

Fig. 3 of the drawings shows an alternative testing arrangement comprising a series of tubes 300, and a second series of tubes 301. The tubes of the series 300 are similar to those in the group 280 in Fig. 2, except that a collector electrode is added to each tube. The anodes 302, 303, 304 of the tubes 300 are connected over a common conductor 305 to the positive pole of battery 306. The cathodes 307, 308, etc., are, as in Fig. 2, connected over a common conductor and through a common resistance element 309 to the negative pole of battery 310. The starting electrodes 311, 312, etc., are connected to the impulse leads of the phase generator 281. The control grids 313, 314, etc., are connected respectively through the connector 288 to the test conductors of the trunks.

The collector electrodes of the ten tubes of series 300 are connected to the starting electrodes of the corresponding tubes of the group 301. For example, the collector electrode 315 is connected through the resistance 316 to the starting electrode 317 of tube 318. Similarly, the collector electrodes 319, 320 are connected to the starting electrodes of the corresponding tubes 321, 322. The cathodes of tubes 318, 321 and 322 are connected over a common conductor to the negative pole of battery 323. The anodes 324, 325, 326 are connected respectively through the windings of the work relays 327, 328, 329 to the positive pole of the battery.

While the testing operation is in progress, impulses of the successive phases are applied to the starting electrodes of the tubes 300 as described hereinabove. As soon as ionization occurs across the starting gap of a tube whose control grid is connected to an idle trunk, transfer of ionization takes place to the main anode. For example, if the control grid 314 is connected to the first idle trunk in the group, the discharge takes place in the main gap of the tube as soon as the starting gap ionizes in response to the phase impulse applied to the starting anode 312. The circuit for the main discharge gap may be traced from the positive pole of battery 306, conductor 305, anode 303, cathode 308, contacts of operated relay 330, resistance 309 to the negative pole of battery 310. The voltage drop in the resistance 309 prevents the ionization of the control gap of any other tube in the group 300. The flow of discharge current in the main discharge gap of the tube 325 produces a positive potential on the collector electrode 319 raising the voltage across the electrodes 326 and 327 to the ionization point. The starting gap of the tube 321 thereupon ionizes, and transfer takes place to the main anode. Current now flows from the positive pole of battery through the winding of relay 328, anode 325, cathode 327 to the nagative pole of battery 323. Relay 328 operates to register the fact that the corresponding trunk is idle.

What is claimed is:

1. In combination, a group of lines, means for applying a busy condition or an idle condition to each one of said lines, a series of discharge devices associated respectively with the lines of said group, means for producing momentary impulses of a series of separate phases, means for applying to each one of said discharge devices the successive impulses of a separate one of said phases, means controlled by the idle condition of any one of said lines for causing discharge current to flow in the associated discharge device in response to the application of one of said impulses to said associated device, means effective in response to the flow of said discharge current for rendering the other of said discharge devices unresponsive to the subsequent application of said impulses thereto, and means for identifying the idle line selected by the discharged device.

2. In combination, a group of lines, means for applying a busy condition or an idle condition to each one of said lines, a series of discharge devices associated respectively with the lines of said group, means for producing momentary impulses of a series of separate phases, means for applying to each one of said discharge devices the successive impulses of a separate one of said phases, means controlled by the idle condition of any one of said lines for causing discharge current to flow in the associated discharge device in response to the application of one of said impulses to said associated device, means effective response to the flow of discharge current in one of said discharge devices for rendering all other devices unresponsive to impulses subsequently applied thereto regardless of the idle condition of the corresponding lines, and means for identifying the idle line selected by the discharged device.

3. In combination, a group of lines, means for applying a busy condition or an idle condition to each one of said lines, a series of discharge tubes, each having a starting gap and a main discharge gap, means for producing momentary impulses of a series of separate phases, means for applying the impulses of the several phases respectively to the starting gaps of the several tubes of said series, the starting gap of each tube being momentarily and repeatedly ionized in response to the successive impulses of the corresponding phase, means controlled in accordance with the condition of any one of said lines for causing discharge current to flow in the discharge gap of the associated tube in response to one of said impulses, means effective in response to the flow of said discharge current for rendering the starting gaps of the other tubes unresponsive to subsequent impulses, and means for identifying the line corresponding to the discharged tube.

4. In combination, a group of lines, a series of discharge tubes, each having a starting gap, a main discharge gap and a control electrode, means for connecting said tubes respectively with the lines of said group, means for impressing on the control electrode of each tube a condition characterizing the condition of the associated line, means for producing momentary impulses of a series of separate phases, means for applying the impulses of the several phases respectively to the starting gaps of the several tubes of said series, the starting gap of each tube being momentarily and repeatedly ionized in response to successive impulses of the coresponding phase, means dependent on the condition on the control electrode for causing current to flow in the main discharge gap of one of said tubes in response to the ionization of the control gap thereof, means responsive to the flow of said discharge current for rendering the other tubes unresponsive to subsequent impulses, and means for identifying the line connected to the discharged tube.

5. In combination, a group of circuits, a plurality of discharge tubes, each having a starting gap and a main discharge gap, means for connecting said tubes respectively with the circuits of said group, means for producing impulses of a series of separate phases, means for applying the impulses of the several phases respectively to the starting gaps of said tubes, a source of potential and a resistor connected in common to the starting gap and to the main discharge gap of said tubes, the starting gap of each tube being momentarily ionized in response to the combined voltage of said source of potential and the impulses of the corresponding phase, means including said source of potential controlled in accordance with the condition of said lines for causing discharge current to flow through said common resistor and through the main discharge gap of the associated tube in response to the ionization of the starting gap of such tube, the voltage produced by the current flow in said resistor serving to lower the voltage of all starting gaps to prevent the ionization of any gap in response to the subsequent application of said impulses thereto, and means for identifying the line represented by the discharged tube.

6. In combination, a group of lines, means for applying a busy condition or an idle condition to each one of said lines, a series of discharge tubes associated respectively with the lines of said group, a source of alternating potential, means responsive to said source for producing impulses of a plurality of separate phases during each cycle of said source, means for applying to each one of said tubes the successive impulses of a separate one of said phases, means controlled by the idle condition of one of said lines for causing discharge current to flow in the associated tube in response to the application of one of said impulses to said tube, and means effective in response to the flow of said discharge current for rendering the other of said tubes unresponsive to subsequent impulses.

7. In combination, a plurality of groups of lines, a mechanism common to said groups, said mechanism including a series of discharge tubes, means for connecting said tubes to the respective lines of any one of said groups, means for producing impulses of a series of separate phases, means for applying to each one of said tubes the impulses of a separate one of said phases, means controlled in accordance with the condition of any one of said lines for causing discharge current to flow in the associated tube in response to the application of an impulse of the corresponding phase to said tube, and means effective in response to the flow of said discharge current for rendering all other discharge tubes unresponsive to the subsequent application of said impulses thereto.

8. In combination, a group of lines, means for applying a busy or an idle condition to each one of said lines, a series of discharge devices associated respectively with the lines of said group, means for producing momentary impulses and for applying said impulses to the discharge devices, means controlled by the idle condition of any one of said lines for causing discharge current to flow in the associated device in response to the application of one of said impulses to said associated device, means effective in response to the flow of said discharge current for rendering the other of said devices unresponsive to the application of impulses thereto, and means for indicating the idle line selected by the discharged device.

NATHAN I. HALL.